ANTENNA SYSTEM
Filed Sept. 9, 1960 2 Sheets-Sheet 1
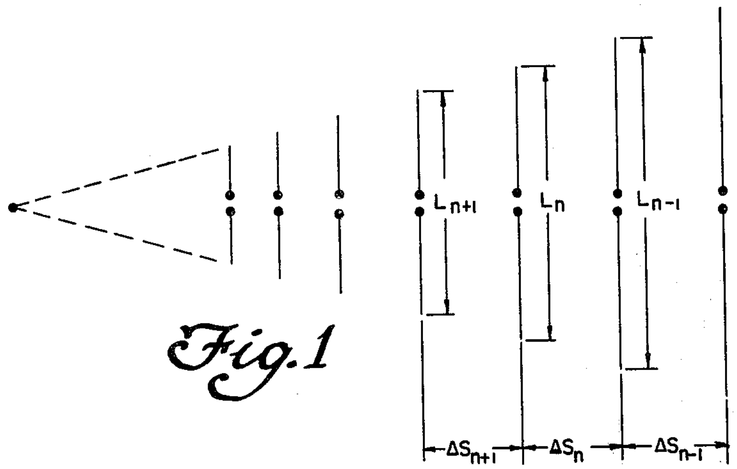
Fig. 1
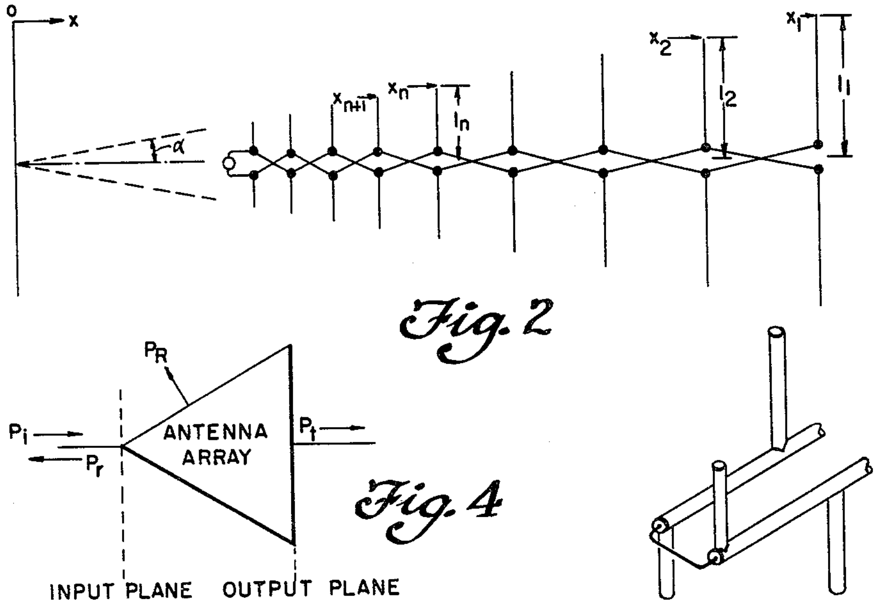
Fig. 2, Fig. 4
Fig. 3
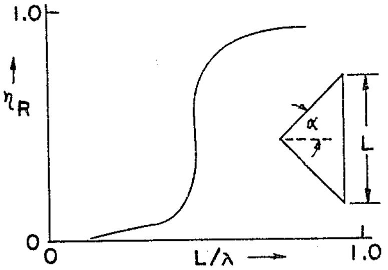
Fig. 5
INVENTORS
John R. Copeland
William J. Robertson
Carlton H. Walter
Charles H. Boehnker
By Anthony D. Cumano INVENTORS
John R. Copeland
William J. Robertson
Carlton H. Walter
Charles H. Boehnker
By Anthony D. Cennamo United States Patent Office 3,162,855

Patented Dec. 22, 1964

3,162,855

ANTENNA SYSTEM

John R. Copeland, William J. Robertson, Carlton H. Walter, and Charles H. Boehnker, Columbus, Ohio, assignors to Ohio State University Research Foundation Filed Sept. 9, 1960, Ser. No. 54,891
2 Claims. (Cl. 343—100)

This invention relates in general to method and means of unifying electronic components and in particular to a novel manner of combining the functional electronic components operable from a source of high frequency signal voltage.

The compactness required by commercial electronics is making mandatory the utmost economy of space in packaging of electronic components. This compactness must not be a sacrifice on its operability and must maintain the highest possible operating efficiencies. Similarly compactness of design as a manufacturing cost factor and improved operation is always of importance in the developments of commercial electronic products.

Until recently the electronic components, such as, vacuum tubes, capacitors and other circuitry are bulky and cumbersome. Despite every effort for neatness and efficiency conventional items such as electronic receivers and transmitters maintained large space requirements. In addition to a loss of space, these bulky components used in the conventional receivers and transmitters lowered considerably the efficiency of the operation of the system. Further, when electronic systems in higher frequency ranges are considered, efficiency requirements become even more stringent and consequently the inefficiency of the conventional components increased.

In the last decade or so there has been a continual development of parameters leading towards effective miniaturization, the most important being the printed circuit and, more recently the semi-conductors, such as, the transistor. These elements not only permit miniaturization but are inexpensive, small, simple, long-lasting, and more reliable than even the most expensive prior used components. Now there has been developed by Dr. Leo Esaki of Japan, another semi-conductor device, a negative resistance element, commonly referred to as the tunnel diode. Despite these developments in the components per se there continues to be the lack of unification. This is especially apparent where the actual transmitting or receiving apparatus is remoted from the antenna. Generally even though a neat package of miniature components may be assembled, and even in the "solid state circuits," the transmission of the signals in the conventional manner from one circuit to the next tends to defeat the intended result. The problem of course becomes more severe as the operating frequency is increased.

In the co-pending application, Serial Number 34,095, filed June 6, 1960, for "Antenna System" a converter circuit is incorporated directly in the tip, or at the point of signal origin, of the antenna. With that arrangement there is provided an antenna system that is broad banded, has instant frequency conversion, and high signal to noise ratio, together with other physical advantages. Although we believe that the antenna system of the co-pending application is capable of results not heretofore obtainable, the arrangement is not universally adaptable to all types of antennas. Of particular concern are the frequency independent antennas developed in the past few years whose operating range can be made to exceed the tuning range of most receivers. Generally these frequency independent antennas comprise an array of elements. The present invention teaches the use of the more recently developed components in a circuit arrangement with the array of elements. This arrangement is free from the conventional losses and inefficiencies incidental to the amplification of the signal between the point of origin and the ultimate utility device. Specifically a circuit and component arrangement without transmission losses is achieved by distributing the amplification through the antenna itself. Such a system has extremely low noise potential because amplification occurs immediately at the point of signal reception before any transmission losses occur in the antenna.

Accordingly, it is a principal object of the present invention to provide a new and improved integrated and unified antenna system.

Another object of the present invention is to provide an integrated and unified antenna system with an efficiency not obtainable through conventional techniques and packaging.

A further object of the present invention is to provide an antenna system and radio frequency amplifier that has an extremely low noise potential.

Still another object of the present invention is to integrate a radio frequency amplifier system using the newly developed electronic components such as the tunnel diodes in an antenna system that permits their maximum efficiency without attendant losses normally encountered with conventional components.

Other objects and features of the invention will become apparent from a reading of the following description together with the drawings in which:

FIG. 1 is a side by side coplanar antenna array illustrating the log-periodic principle;

FIG. 2 is a schematic diagram of the log-periodic antenna array;

FIG. 3 illustrates the connection of the antenna array elements to a balanced feeder;

FIG. 4 illustrates the log-periodic antenna array as a two-port network;

FIG. 5 is a graph depicting the radiating efficiency of the log-periodic array versus size;

Figure 6:
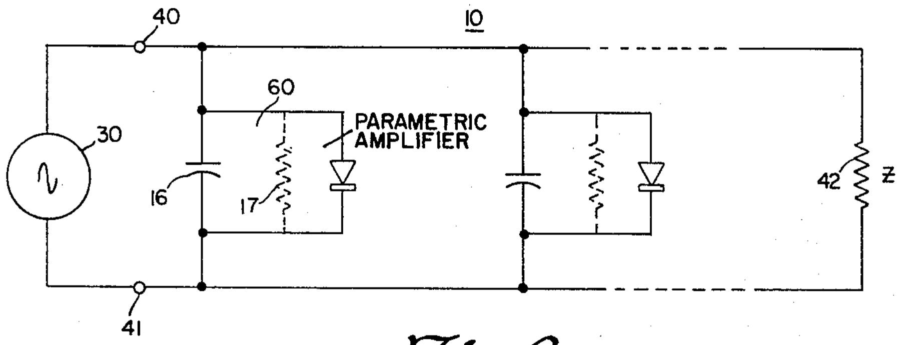
FIG. 6 is a schematic diagram of the present invention.

Log periodic antenna design was first introduced in connection with a plane slot radiator having bidirectional linearly-polarized radiation patterns of constant beamwidth and essentially constant input impedance over better than ten to one bandwidths. Since that time many extensions of the original structure have been introduced providing a large choice of electrical characteristics, all of which are virtually independent of frequency. Log periodic antenna designs are available, are example, which provide omnidirectional, bidirectional, or unidirectional radiation patterns and either linear or circular polarization. The basic unidirectional elements all have moderate directive gains, and it has been shown that high gains are possible through application of array techniques or by using the antennas as primary sources for large reflectors.

The log periodic designs have all been variations of a basic type involving combinations of a single composite element which is shaped to provide the log periodic characteristics. The antennas illustrated with the preferred embodiment demonstrate that the log periodic principles can be applied to the design of arrays of conventional elements with frequency independent performance resulting.

If frequency independent performance is sought from a structure composed of resonant elements the resonance must be staggered in order that as frequency is varied the function of the resonant element is transferred smoothly from one element to the next. In the case of an antenna array composed of similar discrete elements this means that the physical dimensions of the elements must be scaled from one to the next in such a way that the desired frequency range is covered with elements of overlapping response characteristics. Since the characteristics of antenna elements are determined in part by their surroundings, it is necessary also to scale the environment.

Considering now a coplaner array of side-by-side dipoles reference is made to the arrangement shown in FIG. 1. The lengths of the dipoles are related by a constant scale factor as defined in the figure. That is, given the length L of the element of order O in the array, the length of the elements of order $n$ will be given by $\tau^n L$ where $n$ takes on all integral values, positive or negative. Since it is also necessary to scale the environment, the spacings $\Delta s$ between elements must be related in the same manner. If carried to the limit the array converges to the point O on the left as $n \rightarrow -\infty$ and becomes infinite in extent on the right as $n \rightarrow \infty$. If the elements of FIG. 1 are fed in series by means of a common feeder from a generator located at point O, the infinite structure will possess the property of logarithmic periodicity. That is, whatever the fields produced by an excitation frequency $f$ they will be reproduced (apart from a change of scale) at all other frequencies given by $\tau^n f$, where $$\frac{L_{n+1}}{L_n} = \tau$$

The variation in the fields between these frequencies will depend upon the degree of overlap in the individual element responses.

To be useful as a practical broad-band radiator it must be possible to truncate the array so that at all frequencies above some lower limit the truncated antenna performs like the infinite structure. This imposes a requirement for rapid attenuation of the incident wave along the feeder so that only negligible energy is reflected from the truncated end. If this situation occurs it follows that the array characteristic will be periodic in periods of bandwidth $1/\tau$:1. If, furthermore, the variation in performance is negligible over a period then the antenna may be broad banded to any desired degree by simply adding elements according to the general scheme.

Referring now to FIG. 2, there is shown a schematic diagram of the array of elements useful in the present invention. The structure is defined in terms of the geometric ratio $\tau$, the angle $\alpha$, and the characteristic impedance of the feeder.

$$\tau = \frac{l_{n+1}}{l_n} = \frac{X_{n+1}}{X_n}$$

$$\alpha = \tan^{-1} \frac{l_n}{X_n}$$

The feeder impedance has not been found to be critical, and for most of this investigation 105 ohm, rigid, open wire line was used. The method of obtaining the 180° phase reversal between elements may be obtained by the arrangement shown in the sketch of FIG. 3. The array is fed by means of a coaxial cable brought to the input terminals through one of the balanced line conductors. No balun is required for this method of feeding.

It is necessary of the array that the electrical properties of the truncated structure converge to characteristic values as the frequency is increased. Above some low-frequency limit, determined by the maximum physical dimension of the array, the electrical properties are identical to those of the infinite structure.

If the antenna array is thought of as a linear-passive four-terminal network with input terminals at the apex and output terminals at the truncated end then it may be considered as shown in FIG. 4. It is required that for the truncated antenna, the transmitted power $P_t$, through the network, be only a negligible part of the net power input, $P_i - P_r$. In other words, the transmission coefficient $S_{12}$ of the network must be small. It is essential that the antenna configuration convert, efficiently, the power incident on the feeder to radiated power $P_R$. The radiating efficiency is defined as $$\eta_R = \frac{P_R}{P_i - P_r}$$

In terms of the scattering coefficients this becomes $$\eta_R = \frac{1 - |S_{11}|^2 - |S_{12}|^2}{1 - |S_{11}|^2}$$

Note that the efficiency so defined does not take into account the conductor losses in the elements, and is therefore the true radiating efficiency only in the lossless case.

In determining the scattering parameters, the image of the unit circle in the output plane is determined experimentally and plotted in the input reflection coefficient plane. This may be accomplished by a simple series of slotted line measurements of the input reflection coefficient as a function of pure reactive terminations at the output terminals. Determination of the unit image circle and its iconocenter is sufficient for determination of the scattering matrix elements. A curve of radiation efficiency as a function of array size is shown in FIG. 5 for one of the models tested. Notice that by the time an element of length $\lambda/2$ is added nearly 80 percent of the power is being radiated.

The characteristic radiation pattern of the array is an endfire beam in the negative $x$ direction, as indicated in FIG. 2. The beamwidths are nearly constant in both principal planes and the directivity is a function of both $\tau$ and $\alpha$. It is not, therefore, possible to control the pattern independently of the input impedance, but it should be possible to make satisfactory compromises when selecting parameters. The characteristic radiation patterns of the array will vary with $\alpha$ for three values of $\tau$. Cross polarization for these antennas is considerably better than 20 db below pattern maximum if care is taken with regard to mechanical symmetry. For the typical pattern measurements shown, the balanced feeder is terminated in a short circuit a distance $l_1/2$ beyond the terminals of element $l_1$.

Since the log periodic dipole array may be truncated at both ends and still provide nearly frequency independent performance over some range of frequencies, it is clear that, in the interest of saving size and weight, a particular antenna should be designed to meet the minimum required bandwidth. The upper and lower frequency limits is determined by lengths of the shortest and longest elements of the array respectively. If the usable bandwith of this antenna is taken to be the range from 1100 to 1800 mc. then the size of the antenna for any desired bandwidth is defined. That is, the longest dipole element should be approximately 0.47 wavelength long at the lower limit and the shortest element should be about 0.38 wavelength long at the higher wavelength. There will, of course be some minimum number of elements necessary to provide a suitable front to back ratio at the low frequency limit.

The array discussed in the foregoing should prove useful in several applications. The model used to demonstrate bandwidth control shows that these antennas will make excellent rotatable beams, superior in many respects to the parasitic types currently in use. In addition to the practical usefulness of the log periodic dipole arrays there is another equally interesting and important aspect of the design, the fact that these structures are made up of conventional linear elements.

Although the fundamental operation of the components and circuit is not altered by the frequency of the system, generally speaking the higher the frequency the greater the losses, with an attendant poorer signal to noise ratio. Recent improvements in circuits and components, principally broad band antennas, parametric amplifiers, transistors, printed circuitry and tunnel diodes have improved considerably the electronic system performance. These impoved systems are efficiently operable over ranges and at varying temperatures that were unbelievable just a few years ago.

Despite the improvements in operation the efficiency of the electronic systems was yet not satisfactory in the higher frequency ranges for most purposes. Furthermore, the unification or integration of the components to obtain higher operating efficiencies has not been realistically approached. The present invention teaches a unification of components that realizes a true unified design. Specifically, it is customary to remote the receiving antenna from the radio frequency amplifier, converter, intermediate and detector circuits. Similarly in a transmitting system the antenna is remoted from the oscillator, modulator and power amplifier circuits. The antenna is generally remoted to take advantage of height, less interference and other atmospheric advantages. Furthermore, because of its size, the antenna is not conducive to packaging or boxing as a component of a system Accordingly, it is found that the signal transmission paths contribute losses. Even where each circuit per se, is unitized, it has been found that the radio frequency transmission lines bridging the radio ferquency amplifier circuits to the antenna were significant sources of loss and attendant noise.

A prime factor in determining the maximum available signal-to-noise ratio is the loss of signal power in the antenna and radio frequency transmission circuits before the signal reaches the first amplifier. The solution of the problem is very difficult or unattainable with conventional components; however, with the introduction of the tunnel diode, it has been found that the radio frequency amplifier may be combined directly at the extreme end or radio frequency signal point of the antenna.

Furthermore, in the broad band antenna, such as that described above, we have also found that a plurality of radio frequency tunnel diode circuits may be uniquely combined directly within the antenna structure itself. In this way signal amplification is distributed through the antenna structure itself. This system has an extremely low noise potential because amplification occurs immediately at the point of signal reception before any transmission losses occur in the antenna.

Figure 7:
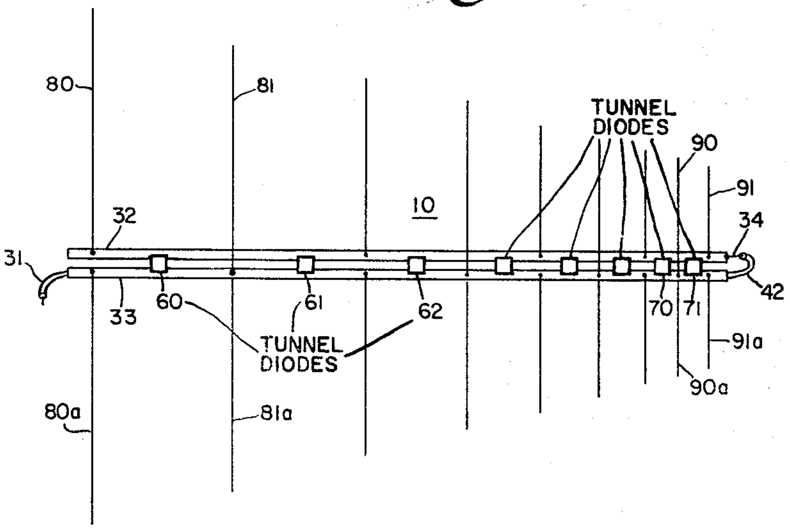
FIG. 7 is an illustration of a constructed preferred embodiment of the present invention.

Referring now to FIG. 7, there is illustrated a preferred constructed embodiment of the log-periodic type of antenna incorporating the plurality of radio frequency amplifiers in accordance with the teachings of the present invention. Specifically, as illustrated, the approach is to incorporate the functional radio-frequency amplifier elements 60–71 in the antenna structure that will provide a useful radio frequency signal greater than that of the antenna. In the initial embodiment of the present invention the radio frequency amplifiers were uniformly spaced at ¼ wavelength at the center frequency of the antenna. This antenna system performed satisfactorily, generally, in providing a low noise, lossless signal. However, at the higher frequencies the improvement was not as significant. In the preferred embodiment of FIG. 7, we discovered a unique arrangement of radio frequency amplifiers and the log periodic antenna to give superb results throughout the entire frequency capabilities of the antenna. This was accomplished by spacing the radio frequency amplifiers at the same ratio as the elements are spaced that comprise the antenna. In the embodiment illustrated, the elements 80–91 and **80*a*–91*a* are spaced logarithmically and, accordingly, the radio frequency amplifiers 60–71** are also spaced logarithmically. The number of amplifiers shown in FIG. 7 equals that of the compromising elements; however, an equal number of radio frequency amplifiers to elements may not be required. The number of amplifiers is a matter of design—the only stringent requirement for complete results is that the amplifiers have a similar spacing to that of the elements of the antenna.

In the embodiment of FIG. 7, the feed line 31 is extended through the antenna tubing 33 to the terminating point 42 where only the center conductor 34 is extended through the antenna tubing 32. The tunnel diode used was ZJ 56 germanium tunnel diode manufactured by General Electric. Tunnel diode amplifiers were soldered directly to the structures 32 and 33, at the exact points where amplification is desired. This provides true integration of the plurality of amplifiers with the antenna without an increase in bulk since for practical purposes, the area used by the amplifiers would normally be waste space. Although we have described the integrated antenna having tunnel diode radio frequency amplifiers it may be advisable in certain instances to integrate parametric amplifiers—variable capacitance diodes—in the antenna system. Further advantage may be obtained through the use of parametric amplifiers in signal-to-noise ratio, and, of course, D.C. is not required.

In the conventional traveling wave antenna ferrite isolators are generally employed to suppress the backward traveling wave caused by mismatch which could otherwise create instability. In the tunnel diode integrated antenna system the backward wave is radiated from the antenna structure thusly elimating the isolation problem.

In FIG. 6, specifically, there is illustrated the circuit equivalent of the integrated antenna system of the present invention. The tunnel diode radio frequency amplifiers or the parametric amplifiers—such as 60 characterized by the variable capacitance 16 and resistance 17 network—are interspersed within the structure 10. The resistance 42 is the terminating impedance and terminals 40 and 41 are feeding points of the signal from source 30.

Figure 8:
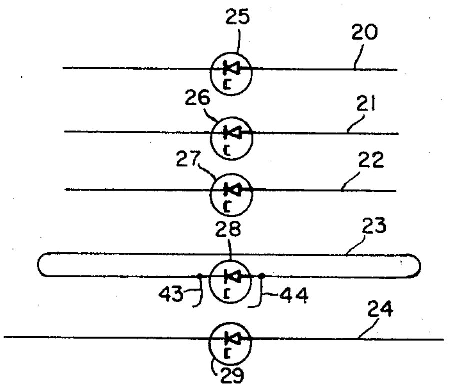
FIG. 8 is another embodiment of the present invention.

In the preferred embodiment of FIG. 7, the invention is illustrated with a log-periodic antenna also described above. Although the present invention does lend itself expressly and uniquely to that type of antenna, the invention will also lend itself to other multiple element antennas or arrays which may or may not be of the broad band type. For instance, there is shown in FIG. 8 a Yagi type of antenna that has found wide commercial success. The elements 20, 21, and 22, being the radiating elements and the element 24, the reflecting element for the folded dipole 23. Again, at the intermediate point of the dipoles are amplifiers 25 through 29 each amplifying the radio frequency signal at its initial point prior to the normally occurring transmission losses.

The limitations encountered in adapting the invention to other types of antennas is that it must have a plurality of elements distributed along its longitudinal axis or the antenna must be extended along the direction of the radio wave. The other limitation is that pointed out above, that is, for complete improved operability over the entire range of the antenna, the plurality of amplifiers must be spaced in the same ratio as the spacing of the elements.

Although certain and specific embodiments have been shown and described, it is to be understood that modifications may be made thereto without departing from the spirit and scope of the invention.

What we claim is:

1. An antenna system comprising a plurality of elements, a structure defining the longitudinal axis of said elements having said elements supported thereon a predetermined distance apart, said spacing between said elements being logarithmic; a plurality of radio frequency amplifiers each including a tunnel diode mounted directly on said structure and having the same logarithmic spacing apart as that of said elements, and means for operatively connecting said amplifiers to said antenna system at their respective mounting joints.

2. An antenna system comprising a plurality of elements, a structure defining the longitudinal axis of said elements having said elements supported thereon a predetermined distance apart said spacing between said elements being logarithmic; a plurality of parametric radio frequency amplifiers mounted directly on said structure and having the same logarithmic spacing apart as that of said elements, and means for operatively connecting said amplifiers to said antenna system at their respective mounting joints.

References Cited in the file of this patent

UNITED STATES PATENTS 2,578,973 Hills ________________ Dec. 18, 1951

OTHER REFERENCES

I.R.E. Transactions on Antennas and Propagation, vol. AP-8, No. 3, May 1960, pp. 260-267.

Graphical Symbols for Electrical and Electronic Diagrams, Part 1 (MIL-STD-15-1), Oct. 30, 1961, U.S. Government Printing Office, Washington, D.C.